Dec. 26, 1950  C. R. STOELTING ET AL  2,535,462
CONTINUOUS FREEZING MACHINE
Filed Aug. 4, 1948  2 Sheets-Sheet 2

INVENTORS
CARL R. STOELTING
OLOF E. STAMBERG
BY E. FRED VILTER
John W. Michael
ATTORNEY Patented Dec. 26, 1950

2,535,462

UNITED STATES PATENT OFFICE 2,535,462

CONTINUOUS FREEZING MACHINE

Carl R. Stoelting, Oconomowoc, Olof E. Stamberg, Waukesha, and Ernest F. Vilter, Milwaukee, Wis., assignors to Industrial Research Laboratories, Milwaukee, Wis., a corporation of Wisconsin Application August 4, 1948, Serial No. 42,404

6 Claims. (Cl. 62—114)

1

This invention relates to frozen confection machines of the type having a chamber continuously receiving a mix at one end and discharging an edible frozen product at the other end. The terms "frozen confection," "ice cream" and "frozen custard" are used as equivalents herein.

One object of this invention is to produce a frozen confection machine which is inexpensive to manufacture and to operate, increases the overrun without causing objectionable crystal formation or growth, and will meet all health standards as regard cleaning and inspection.

Another object of this invention is to provide an improved refrigerating system for a continuous type frozen custard machine. The refrigerating systems previously employed in machines of this type have generally been of low efficiency. The present machine employs a flooded evaporator with provision for vaporizing and superheating the refrigerant while in contact with the freezing chamber, thus obtaining highly efficient operation.

Another object of this invention is to provide an improved mutator for propelling and agitating the mix during the course of its travel from the receiving to the discharging end of the freezing compartment. This type of frozen custard machine requires a mutator which throws the mix against the refrigerated walls of the freezing chamber and continuously scrapes the frozen mix from the walls while propelling it through the chamber. The present mutator additionally agitates or beats the mix in the proximity of the receiving end of the chamber. The beating zone of the freezing chamber is maintained at a low temperature by means of the improved refrigerating system. It is believed that the beating and the maintenance of rapid freezing conditions in the beater zone individually contribute to the 100% increase in overrun obtained with this machine and in combination produce very satisfactory results without impairing the velvety texture desired especially in production of frozen custard.

A further object of this invention is to provide a simplified mounting for the scraper blades carried by the shaft in the freezing chamber. Cooperating notches on the scraper blade and the carrying member result in a mounting which is readily cleaned and allows the blade to move to a limited extent as required by variations in the load.

A still further object of this invention is to provide a frozen custard machine having a horizontal freezing chamber which may be opened at both ends to permit ready access for cleaning and inspection of the interior. This feature is of great importance since the health regulations of many municipalities provide that no machine without such accessibility may be operated within the city. The reason for this will be obvious when it is considered that dairy products are very susceptible to bacteria growth and must, therefore, be capable of being maintained in extremely sanitary condition.

Other objects and advantages will be pointed out in, or be apparent from, the specification and claims, as will obvious modifications of the single embodiment shown in the drawings, in which:

Figure 1:
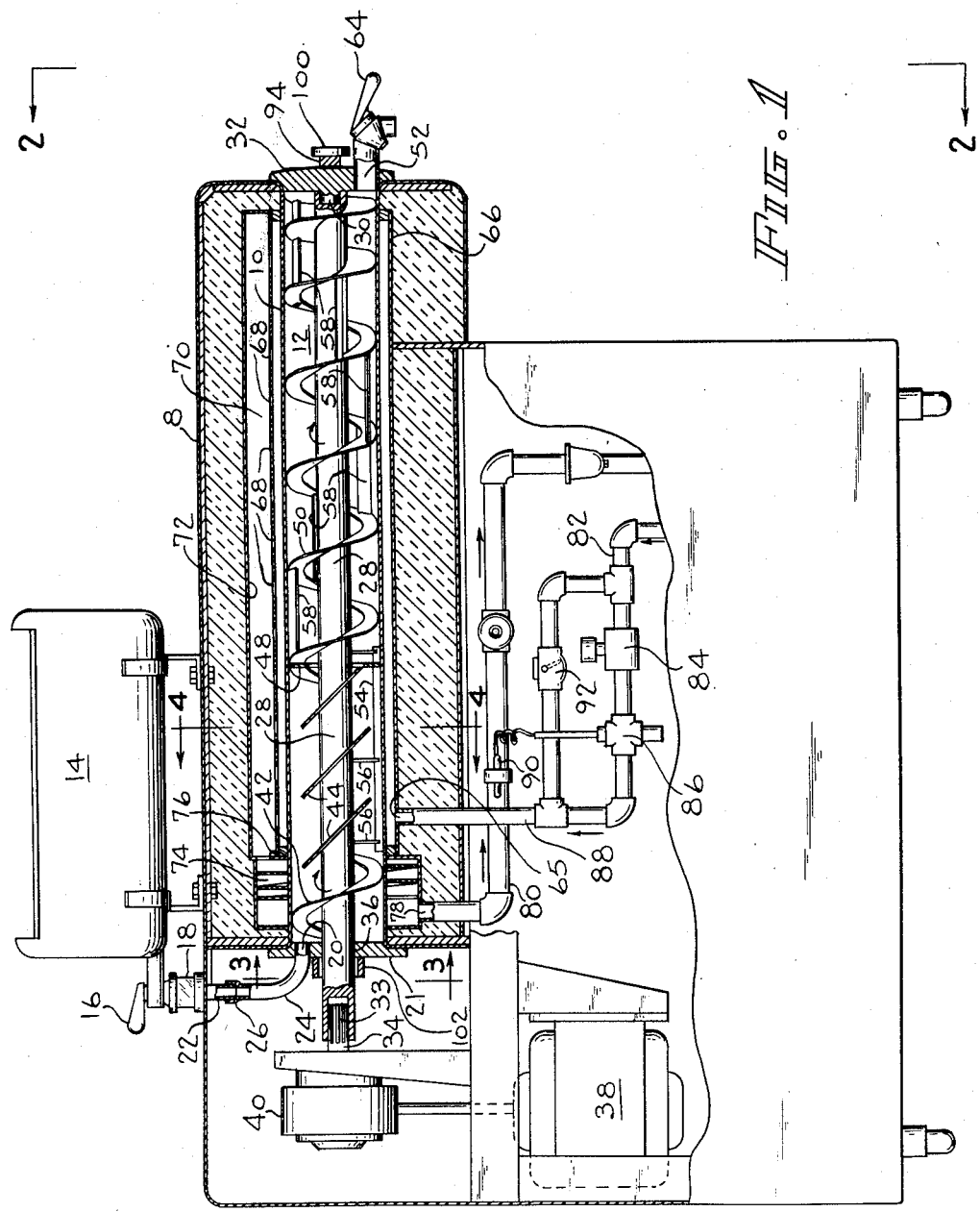
Fig. 1 shows the general layout of the freezer and its associated mechanism partly in section and with parts broken away.

Referring to the drawings in detail, Fig. 1 shows casing 8 containing insulated cylinder 10 defining an open-ended cylindrical freezing chamber 12 in which the mutator, to be described in detail hereinafter, picks up the frozen confection mix at the left-hand end of the chamber and continuously discharges the frozen confection at the other end. The confection mix flows, as regulated by valve 16, from hopper 14 into inlet 20 in cover 21 on the receiving end of chamber 12 through watch glass 18 and pipes 22, 24 which are readily disconnected by means of any suitable telescopic joint 26 the purpose of which will appear hereinafter.

Inwardly projecting stud 30 on front cover head 32 serves as a bearing for the hollow right-hand end of mutator shaft 28. Shaft 28 is also journalled in central opening 36 in the rear head 21 through which it extends. The straight inside splines 33 on the left-hand end of the shaft are connected to shaft 34 which is driven in a clockwise direction (as viewed from right-hand end of Fig. 1) by electric motor 38 through reduction gearing 40. It will be apparent that the mutator shaft and the parts mounted thereon may be withdrawn from the right-hand end of the chamber when head 32 is removed by a method to be described hereinafter.

Figure 4:
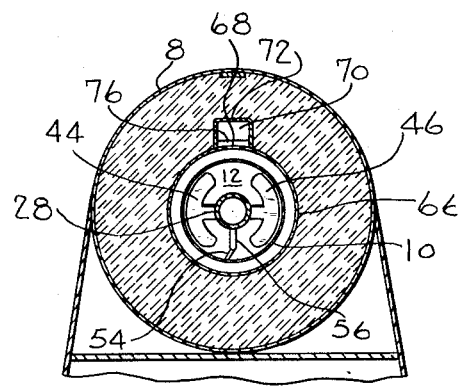
Fig. 4 is taken along line 4—4 of Fig. 1 to show the end view of the beaters and the wet refrigerated gas manifold positioned above the evaporator.
Figure 5:
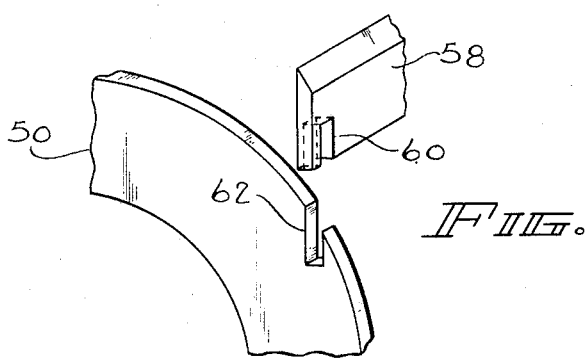
Fig. 5 shows the cooperating notch connection for mounting the scraper blade on the spiral.

Spiral or worm 42 of relatively high positive pitch is mounted on the shaft immediately adjacent inlet 20 to pick up the mix and carry it forwardly, generally parallel to the axis of shaft 28, and feed the mix into the beater zone where beater blades 44, 46 (see Figs. 1 and 4) are mounted on opposite sides of shaft 28. As will appear clearly in Fig. 1 the blades on the opposite sides of the shaft lie in the same plane and reference to Fig. 4 will show that the outer eliptical edges of the blades conform with the circular interior wall of cylinder 10 by virtue of the inclination of the blades with respect to the shaft. Referring again to Fig. 1, as the shaft rotates from the position illustrated, blades 44 on the near side of shaft 28 move upwardly and tend to propel the charge forwardly while at the same time blades 46 on the opposite side of the shaft will tend to move that portion of the charge rearwardly. Thus blades 44 may be said to be positively pitched in that they move the mix forward when the shaft is rotated. Conversely, blades 46 may be referred to as negatively pitched. When the shaft has rotated 180°, the blades as viewed in Fig. 1 would appear to be inclined in the opposite direction, and the near blade would be negatively pitched blade 46. At this time the charge on the near side of the cylinder will tend to move rearwardly. Thus the beater blades 44, 46 cooperate to beat or oscillate the charge back and forth in this zone of cylinder 10. This beating action would, in absence of worm 42, tend to keep the charge in the same zone in the chamber. Since worm 42 maintains a feed into the beater zone, the charge is continuously moved toward the outlet but has a generally oscillatory action superimposed on the forward motion. It should be understood, however, that screw 42 could be omitted and the blades 44, 46 inclined with respect to the shaft to produce more forward movement than rearward movement and thus convey the charge through the beater zone while retaining the beater action.

The discharge from the beater section into the final zone may be regulated, if desired, by means of annulus 48 having a central opening of larger diameter than shaft 28 to which it is secured. By varying the size of the opening between the shaft and the ring through which the charge must be forced, the state of the charge in the beater zone may be predetermined. It should be understood, however, that the ring need not be employed since the refrigerating capacity may be so great as to obtain the proper state of the charge leaving the beater zone without impeding the flow.

The charge leaving the beater zone is fed into and picked up by screw or worm 50 which carries the mix toward the outlet. In this zone, as in the beater zone, the charge is thrown out against the refrigerating walls, which are continuously scraped by blades 58 to be described in detail hereinafter. Approximately the last two convolutions or flights of screw 50 are of reduced pitch to increase the driving force pushing the frozen custard out of the outlet 52. This reduction in pitch of the last two flights allows use of a smaller motor and eliminates the complicated provision of an extra worm of small diameter in a co-axial, aligned discharge chamber as previously used in some of these machines.

In both the beater zone and the worm section following the beater zone, the freezing of the mix on the refrigerated walls of the cylinder is a continuous process. In the beater zone one scraper 54 is carried by three radially mounted arms 56 at an angle with respect to the interior of cylinder 10. As may be seen in Fig. 1, scrapers 58 on screw 50 following the beater section generally overlap. All of these blades are carried by adjacent aligned portions of the screw flights at an acute angle with respect to the wall of cylinder 10 with the leading or scraping edge facing in the direction of rotation. The blades are notched at 60 to loosely fit and engage with notches 62 on worm 50. Scraper 54 is similarly mounted on the three arms 56. This provides a simple joint which may readily be cleaned and, additionally, compensates for slight mutator shaft eccentricities, since centrifugal force and the load acting on the face of the blade cause the blade to move bodily outwardly to contact the wall of the cylinder.

Thus the charge entering chamber 12 through an orifice 20 is conveyed forwardly by worm 42 to the beater section where it is simultaneously beaten, thrown against and scraped from the walls to be discharged into spiral 50 where it is conveyed toward the outlet 52 while being continuously scraped from the walls. The reduced pitch portion of worm 50 adjacent outlet 52 increases the force pushing the charge out of the cylinder. Thus the mutator conveys the mix from the inlet to the outlet, beats the mix in a zone of the cylinder, and continuously scrapes frozen mix from the walls.

Cylinder 66 is concentric with and surrounds the major longitudinal portion of cylinder 10 to define a flooded evaporator 67 for compressed liquid refrigerant entering at 65. A plurality of holes 68 along the top of the evaporator allows escape of wet refrigerant gas into manifold 70 defined by channel 72 welded or otherwise secured to the top of cylinder 66. The wet refrigerant gas flows from the manifold into coil 74 wrapped around the receiving end of freezing chamber 12 in heat transferring relationship with the cylinder wall. Should any liquid refrigerant get into manifold 70, dam 76 prevents flow of the liquid into the coil 74 to insure that the coil contain only gaseous refrigerant. The superheated refrigerant gas leaving coil 74 at outlet 78 is conducted to the compressor inlet by suction line 80.

Compressed liquid refrigerant flows from the condenser, not shown, through pipe 82 past electric stop valve 84 into thermostatic expansion valve 86 which regulates the flow into conduit 88, discharging into the bottom of the evaporator at 65 to obtain the greatest refrigerating capacity in the beater zone. The thermostatic expansion valve is controlled by feeler bulb 90 strapped on suction line 80 to regulate refrigerant flow to the evaporator valve in accordance with the degree of superheat and is preferably adjusted to substantially flood the evaporator. It is, of course, preferred that the bulb be pressure limit charged or have some equivalent means for preventing refrigerant flow to the evaporator during pull-down to permit use of a smaller motor driving the compressor. It will be noted that refrigerant feed line 88 is connected to the condenser outlet conduit 82 by means of by-pass check valve 92 to prevent building up excess pressure in the evaporator.

This refrigerating system incorporates sound principles resulting in high efficiency. The introduction of the compressed refrigerant at the beater zone insures greatest refrigerating capacity in the beater zone causing rapid freezing of the charge being beaten. This rapid freezing in the beater zone is thought to account in part for the increased overrun obtained by this machine without objectionable crystal formation. The oscillatory beating action superimposed on the general forward charge movement by the beaters in the rapid freezing zone is also thought to contribute to the increased overrun.

Figure 2:
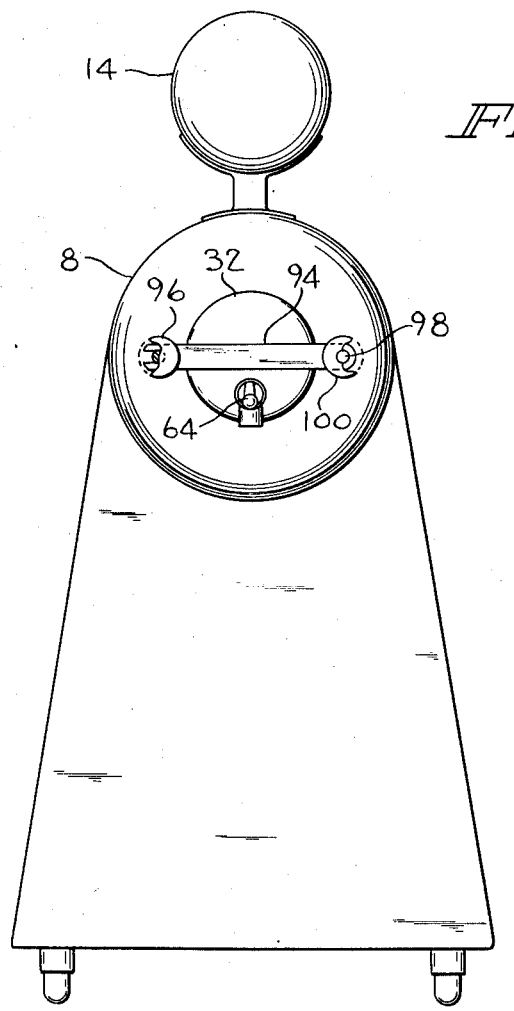
Fig. 2 is a front end view of the freezer taken along line 2—2 of Fig. 1.

As pointed out hereinbefore, it is necessary that cylindrical freezing chamber 12 be accessible from both ends to permit of proper cleaning and inspection of the interior in order to meet the strict standards set by some cities. Both end covers of the present machine may be readily removed without use of any tools. A portion of flanged cover 32 on the front end of chamber 12 snugly fits within the open end of chamber 12 with the flanged head seated against the casing. The cover is held in place by means of bar 94 extending across the cover with its left-hand bifurcated end (Fig. 2) snugly fitting under headed member 96 secured to the casing and its other end secured by means of a bolt extending through hole 98 in the bar and threaded into the casing. The bolt is provided with a hand wheel 100 so that it may be readily removed without the use of special tools. When the bolt has been removed, the bifurcated end of bar 94 may be withdrawn from its position under headed member 96 to allow removal of head 32 to expose the interior of the front end of the chamber.

Since the left-hand end of shaft 28 is splined to drive shaft 34 and the right-hand end is journalled on stud 30 on head 32, the mutator, comprising the shaft and its associated mechanism, may be freely withdrawn from chamber 12 when front head 32 is removed.

Figure 3:
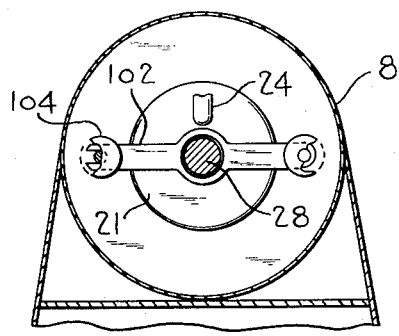
Fig. 3 is a rear end view as viewed from line 3—3 in Fig. 1 to illustrate the means for securing the back cover to the chamber and casing.

As may be seen in Fig. 3, rear head 21 is secured to the casing in a similar fashion by means of bar 102 having a bifurcated end under headed member 104 and its other end provided with a hole receiving the hand wheel carried bolt. Bar 102 is, however, provided with a central opening through which mutator shaft 28 extends when splined to drive shaft 34. When bar 102 has been removed (as set forth in connection with bar 94) and the telescopic connection 26 between feed conduits 22, 24 has been released, head 21 and conduit 24 may be removed to expose the rear end of chamber 12.

We claim:

1. In a continuous freezer, a freezing cylinder adapted to continuously receive a mix at one end and discharge a frozen product at the other end, an evaporator surrounding a portion of said cylinder and adapted to receive compressed liquid refrigerant, and a coil around another portion of the cylinder and connected to the evaporator to receive and superheat the gaseous refrigerant leaving the evaporator.

2. In a continuous freezer, a freezing cylinder adapted to continuously receive a mix at one end and discharge a frozen product at the other end, an evaporator surrounding a major portion of said cylinder, a valve controlled by temperature responsive means for regulating flow of compressed liquid refrigerant to the evaporator to substantially flood the evaporator, a manifold connected to and mounted on top of the evaporator to receive the wet gaseous refrigerant leaving the evaporator, and a coil around another portion of the cylinder in heat transmitting contact and receiving the wet gaseous refrigerant from the manifold to superheat the refrigerant, said temperature responsive means being responsive to the temperature of the superheated refrigerant leaving said coil to maintain said evaporator in a flooded state.

3. In a continuous freezer, a freezing cylinder containing a mutator adapted to continuously receive a mix at one end and discharge a frozen product at the other end, a cylindrical refrigerant evaporator surrounding a portion of said cylinder, a coil wrapped around said cylinder and receiving gaseous refrigerant from said evaporator, and means for maintaining a supply of refrigerant to the evaporator.

4. In a continuous freezer, a casing containing a cylindrical freezing cylinder adapted to continuously receive a mix at one end and discharge a frozen product at the other end, a flanged cover seated against said casing with a portion of the head fitting within said cylinder, said cover having a central opening therein, a retaining member removably mounted on the casing and extending across said cover to hold the cover seated in the cylinder and against the casing, said member having a central opening aligned with the central opening in said cover, a hopper mounted on the casing and adapted to serve as a reservoir for the mix feeding into said one end of the cylinder, an inlet in said cover for receiving the mix from the hopper, a conduit connecting said hopper and said inlet and including joint means which may be readily disconnected to allow removal of said cover when said retaining member has been removed from said casing, another cover removably secured to said other end and having an opening therein adapted to serve as an outlet for said frozen product, and a mutator in said cylinder and including a shaft extending through the openings in said member and the first said cover at the one end of the cylinder and journalled on said other cover at the other end of said cylinder, said shaft being connected to a drive shaft adapted to rotate the mutator to convey the mix from the inlet to the outlet.

5. In a continuous freezer, a cylinder defining a freezing chamber, said chamber being adapted to receive a mix at one end and discharge a frozen product at the other end, a shaft mounted in said chamber, means carried by said shaft for maintaining a general forward movement of the mix from said one end to said other end, means mounted on the shaft in a zone of the chamber for superimposing on said general forward movement of the mix a relative back and forth beating movement, refrigerating means including an evaporator receiving compressed liquid refrigerant and being maintained in a flooded state, and a coil surrounding a portion of said cylinder receiving and superheating gaseous refrigerant leaving said evaporator, said coil being positioned adjacent the receiving end, and the inlet to said evaporator being proximate to the beating zone for maintaining a high rate of heat transfer in the beating zone.

6. In a continuous freezer, a freezing cylinder adapted to continuously receive a mix at one end and discharge a frozen product at the other end, an evaporator surrounding said cylinder and having an inlet for compressed liquid refrigerant at the bottom of said evaporator, a manifold mounted on top of and connected to said evaporator to receive gaseous refrigerant leaving the evaporator, said manifold being connected to the suction line of a compressor, and a thermostatic expansion valve responsive to the refrigerant temperature in the suction line to regulate flow of compressed liquid refrigerant to said evaporator through said inlet to maintain the evaporator in a substantially flooded state.

CARL R. STOELTING.
OLOF E. STAMBERG.
E. FRED VILTER.

REFERENCES CITED

The following references are of record in the file of this patent:

UNITED STATES PATENTS

| Number | Name | Date |
|---|---|---|
| Re. 21,827 | Erickson | June 17, 1941 |
| 772,656 | Gerner | Oct. 18, 1904 |
| 1,500,061 | Dimm | July 1, 1924 |
| 2,050,975 | Morrow | Aug. 11, 1936 |
| 2,080,971 | Oltz | May 18, 1937 |
| 2,324,395 | Hoop | July 13, 1943 |
| 2,338,362 | Smith | Jan. 4, 1944 |
| 2,402,931 | Thomas | June 25, 1946 |
| 2,418,746 | Bartlett et al. | Apr. 18, 1947 |